G. E. BRADSHAW.
PETROL ENGINE BEARING.
APPLICATION FILED MAY 15, 1918.
1,301,370.
Patented Apr. 22, 1919.
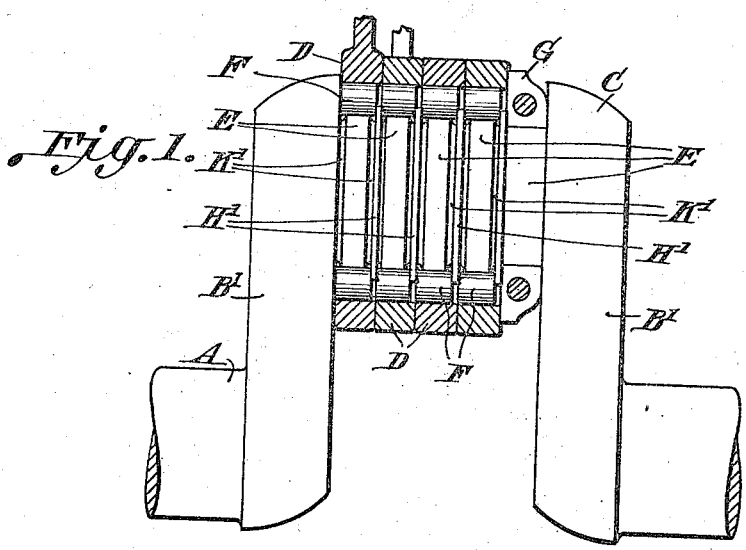
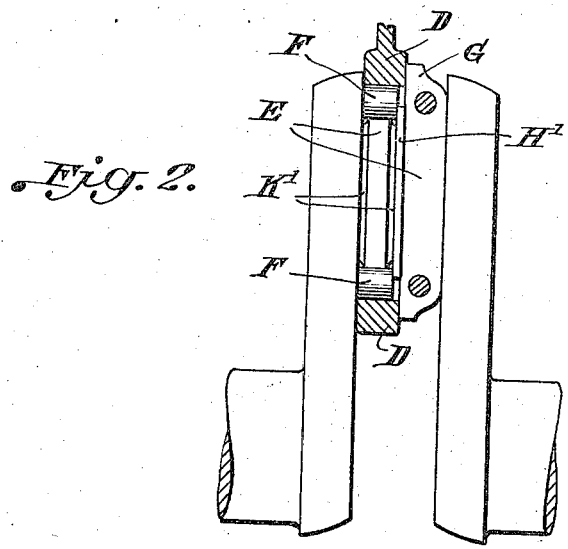
Inventor,
Granville E. Bradshaw
by Arthur H. Cranley
Attorney.

UNITED STATES PATENT OFFICE.

GRANVILLE EASTWOOD BRADSHAW, OF WALTON-ON-THAMES, ENGLAND, ASSIGNOR TO HIMSELF AND A. B. C. MOTORS LIMITED, OF WALTON-ON-THAMES, ENGLAND.

PETROL-ENGINE BEARING.

1,301,370.   Specification of Letters Patent.   Patented Apr. 22, 1919.

Original application filed March 12, 1917, Serial No. 154,356. Divided and this application filed May 15, 1918. Serial No. 234,836.

*To all whom it may concern:*

Be it known that I, GRANVILLE EASTWOOD BRADSHAW, a subject of the King of Great Britain and Ireland, of A. B. C. Motor Works, Hersham, Walton-on-Thames, in the county of Surrey, England, have invented new and useful Improvements in Petrol-Engine Bearings, which is an invention divided out of the application for patent filed March 12, 1917, Serial No. 154,356, and of which the following is a specification.

The object of the present improvements is mainly to shorten the length of the bearing, whether dealing with the engine shaft or the crank pin, whereby each or either of these can be made considerably shorter, as hereinafter described, even though carrying the same, or possibly a greater number of connecting rod ends of the same size as formerly. The result of such close spacing must be to improve the efficiency of the engine, more particularly in the case of several cylinders working upon one crank, inasmuch as a short crank shaft is obviously preferable to a long one, and the balance of the engine when running is also considerably improved. The invention furthermore expedites the fitting or assembling of the parts of the bearing.

A further object is to enable roller bearings to be applied without the necessity of splitting or dividing the end of the connecting rod.

I attain these objects by the devices illustrated in the accompanying drawings, in which Figures 1 and 2 are sectional views of two forms of my invention.

Referring to these drawings, annular flanges or collars H' are formed integral with the crankpin E of a shaft A. These flanges H' are made in the process of turning, and they project sufficiently to keep the rollers F in their respective races but do not prevent the placing in position of the rollers and the rings D, which are the ends of the connecting rods. These rings are each of a width equal to that of a roller and a flange together, so that as shown in Fig. 1 the four rings when touching each other, will have the same range as the four rollers and flanges.

When the rollers have been set in their races and the rods assembled by passing their rings over the end C of the crank web B', the last ring is held in position by means of the split collar G, which is prevented from coming in contact with the roller ends by the last of the flanges H'. If desired, a split collar may also be placed at the other end of the bearing.

According to known practice, the borders of the inner races are provided with grooves K', the object of which is to facilitate the grinding of the races with an emery wheel and so secure a perfectly true surface.

Although the advantages of the arrangement herein described are more obvious in the case of several connecting-rods mounted on a single crankpin, it will be seen from Fig. 2 how the same construction may advantageously be applied even in the case of a single connecting rod, the rollers F being protected from the joints of the split collar G by the flange H'.

I claim:—

1. In a roller bearing for crank pins or shafts, of the kind in which the crank pin or shaft constitutes the inner race, the combination with said pin or shaft of an integral ring constituting the outer race, a circle of rollers between said inner and outer races, the relative sizes of said ring and rollers being such as to allow the ring to be passed upon the shaft and over any crank webs thereon, and a removable split ring upon the same pin or shaft adjacent to one side of the integral ring aforesaid, for the purpose of holding the said ring in position.

2. A crank pin or shaft constituting the inner race of a roller bearing in combination with an integral ring forming the outer race of the same bearing, a circle of rollers between said inner and outer races, an annular flange which is integral with said pin or shaft for keeping the rollers in place laterally and a removable split ring on the same pin or shaft for preventing lateral displacement of the said integral ring.

3. A crank pin or shaft constituting an inner race common to a plurality of roller bearings, in combination with a plurality of integral rings forming the separate outer races of same, a plurality of circles of rollers, each of such circles being in the annular space left between one of said integral rings and the inner race aforesaid, a plurality of annular flanges which are integral with said pin or shaft for keeping the respective circles of rollers in true position laterally, and a removable split ring on the same pin or shaft for preventing lateral displacement of the outer races aforesaid.

GRANVILLE EASTWOOD BRADSHAW.